(12) United States Patent
Izzi et al.

(10) Patent No.: US 12,346,609 B2
(45) Date of Patent: Jul. 1, 2025

(54) LATENCY REDUCTION OF BOOT PROCEDURES FOR MEMORY SYSTEMS

(71) Applicant: Micron Technology, Inc., Boise, ID (US)

(72) Inventors: Roberto Izzi, Caserta (IT); Luca Porzio, Casalnuovo (IT); Sean L. Manion, Boise, ID (US); Massimo Zucchinali, Torre Boldone (IT); Bryan D. Butler, Boise, ID (US); Andrea Vigilante, Milan (IT); Marco Onorato, Villasanta (IT); Alfredo Palazzo, Monza (IT)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 18/520,387

(22) Filed: Nov. 27, 2023

(65) Prior Publication Data
US 2024/0176549 A1 May 30, 2024

Related U.S. Application Data

(60) Provisional application No. 63/385,503, filed on Nov. 30, 2022.

(51) Int. Cl.
*G06F 3/06* (2006.01)
(52) U.S. Cl.
CPC .......... *G06F 3/0659* (2013.01); *G06F 3/0604* (2013.01); *G06F 3/0632* (2013.01); *G06F 3/0674* (2013.01)

(58) Field of Classification Search
None
See application file for complete search history.

(56) References Cited

U.S. PATENT DOCUMENTS

| | | | |
|---|---|---|---|
| 2010/0077193 A1* | 3/2010 | Kim | G06F 12/02 711/202 |
| 2015/0324240 A1* | 11/2015 | You | G06F 9/3851 718/107 |
| 2018/0052694 A1* | 2/2018 | Lee | G06F 13/4022 |
| 2019/0243637 A1* | 8/2019 | Nachimuthu | G06F 8/656 |
| 2021/0089296 A1* | 3/2021 | Banik | G06F 9/4843 |
| 2023/0034837 A1* | 2/2023 | Suryanarayana | G06F 9/45558 |

\* cited by examiner

*Primary Examiner* — Stephanie Wu
(74) *Attorney, Agent, or Firm* — Holland & Hart LLP (57) ABSTRACT

Methods, systems, and devices for latency reduction of boot procedures for memory systems are described. A memory system may receive a first command to perform a first reset of one or more components as part of a first phase of a boot procedure of a host system. The memory system may initiate an initialization process of a second phase of the boot procedure upon determining whether the value of a flag has been set from a first value to a second value. Upon completing the initialization process, the flag may be set to the first value. Parameters corresponding to the characteristics of the memory system may be communicated to the host system based on receiving a second command. The memory system may perform a configuration operation of a logical-to-physical mapping concurrently with communicating the parameters with the host system.

20 Claims, 5 Drawing Sheets

LATENCY REDUCTION OF BOOT PROCEDURES FOR MEMORY SYSTEMS

CROSS REFERENCE

The present application for patent claims priority to U.S. Patent Application No. 63/385,503 by Izzi et al., entitled "LATENCY REDUCTION OF BOOT PROCEDURES FOR MEMORY SYSTEMS" filed Nov. 30, 2022, which is assigned to the assignee hereof, and which is expressly incorporated by reference herein.

FIELD OF TECHNOLOGY

The following relates to one or more systems for memory, including latency reduction of boot procedures for memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Various devices that incorporate memory systems may initiate a boot procedure prior to normal operations. The memory system may be used to reset one or more components during the boot procedure. The number of resets performed during the boot procedure may vary depending on the specific platform and/or system associated with the host system. After each reset, the memory system may proceed through an initialization process and may subsequently communicate pages or blocks of parameters (i.e., descriptors) to the host. In some applications (e.g., automotive), the amount of time used to complete the boot procedure is a sensitive use case that can affect consumer experience as well as functionality of interrelated systems. For example, the boot procedure in an automobile may contribute to delays associated with operating a backup camera, navigation system, entertainment system, etc. The amount of time used to complete the boot procedure may affect consumer experience as well as functionality of interrelated systems.

Techniques are described herein for reducing a latency associated with a boot procedure of devices and host systems incorporating a memory system. In some systems, the boot procedure may be completed before issuing commands that use some structures (e.g., L2P, changelog tables, etc.) to access the memory system. According to the disclosed techniques, the memory system may receive a second command to communicate parameters during some phases of the boot procedure. The memory system may perform a configuration operation of a logical-to-physical (L2P) mapping concurrently with communicating the parameters to the host system. The latency associated with performing the configuration operation after communicating the parameters can therefore be reduced or eliminated. The memory system may receive multiple commands to perform a reset of one or more components that may be configured using subsequent configuration operations. The configuration operations are performed in such a manner as to provide a cumulative reduction in latency associated with receiving additional commands to access the memory system.

In addition to applicability in memory systems as described herein, techniques for latency reduction of boot procedures for memory systems may be generally implemented to support increased connectivity of electronic systems. As the use of systems relying on interconnected electronic devices increases, the connectivity of these electronic devices becomes an increasingly relevant factor for the operations of the system. For example, delays associated with signals communicated between devices may become increasingly relevant as critical systems come to rely more on connectivity, as a system uses larger quantities of interconnected devices, or if the quantity and the complexity of signals communicated between devices increases. Implementing the techniques described herein may support techniques for increased connectivity in electronic systems by providing a cumulative reduction in latency associated with receiving additional commands to access a memory system, among other benefits.

Figure 1:
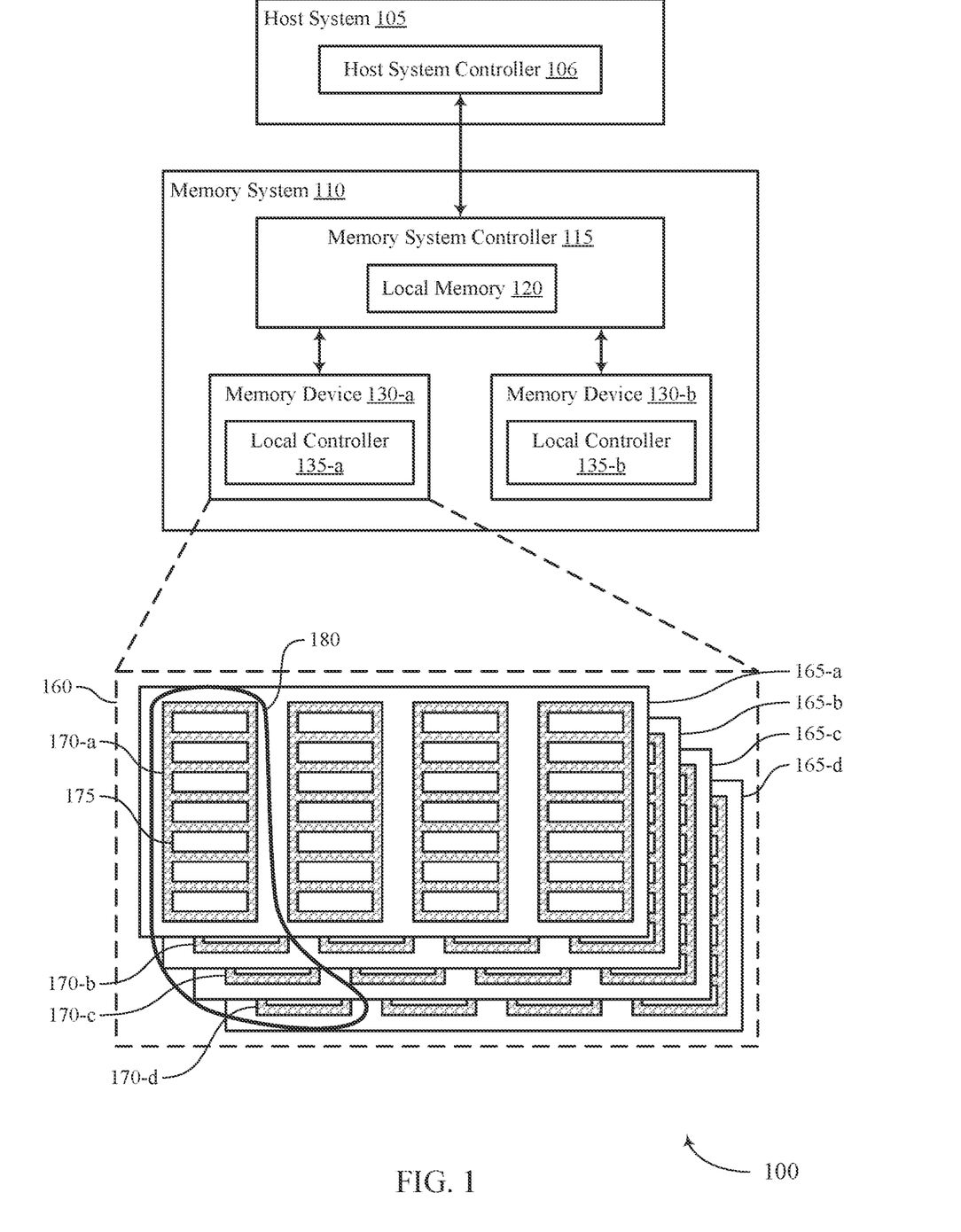
FIG. 1 illustrates an example of a system that supports latency reduction of boot procedures for memory systems in accordance with examples as disclosed herein.

Features of the disclosure are initially described in the context of systems, devices, and circuits with reference to FIG. 1. Features of the disclosure are described in the context of latency reduction of boot procedures for memory systems with reference to FIGS. 2 and 3. These and other features of the disclosure are further illustrated by and described in the context of an apparatus diagram and flowchart that relate to latency reduction of boot procedures for memory systems with reference to FIGS. 4 and 5.

FIG. 1 illustrates an example of a system 100 that supports latency reduction of boot procedures for memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally. or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support latency reduction of boot procedures for memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may receive a first command to perform a first reset of one or more components of a memory system as part of a first phase of a boot procedure of a host system 105. The memory system 110 may determine whether a flag associated with the memory system is set from a first value to a second value. The flag may be a value stored in a register associated with the memory system 110. The memory system 110 may initiate an initialization process of a second phase of the boot procedure based at least in part on determining whether the flag is set to the second value. The memory system 110 may receive a second command to communicate parameters corresponding to characteristics of the memory system with the host system 105. The memory system 110 may perform a configuration operation of a logical-to-physical mapping of the memory system 110 concurrently with communicating the parameters with the host system 105 and after setting the flag from the second value to the first value. The memory system 110 may receive multiple commands to perform a reset of one or more components that may be configured using subsequent configuration operations. The configuration operations are performed in such a manner as to provide a cumulative reduction in the latency associated with receiving additional commands to access the memory system. Accordingly, the amount time used for devices and systems to become fully operational may be reduced.

Figure 2:
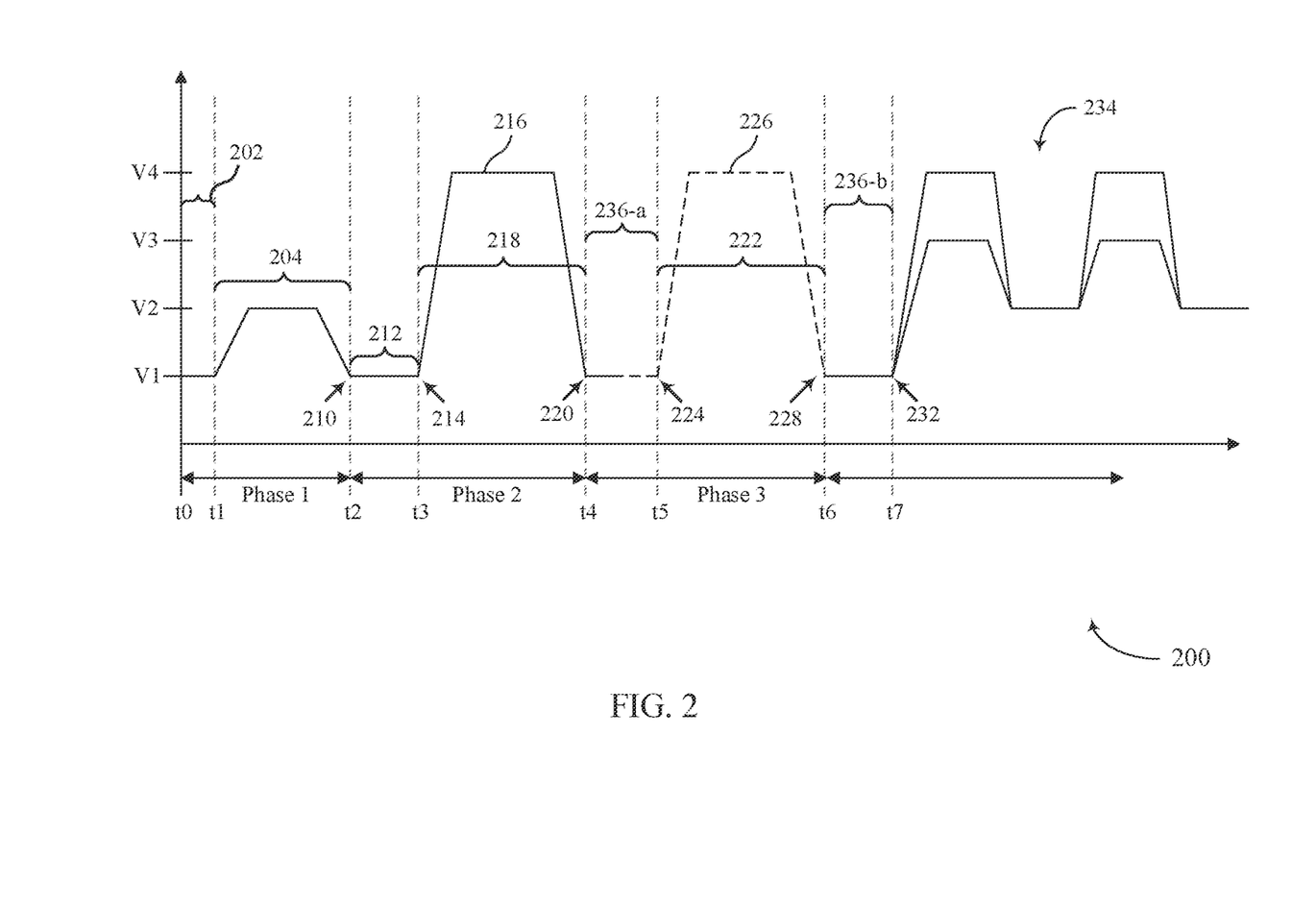
FIG. 2 illustrates an example of a boot trace diagram for a memory system that supports latency reduction of boot procedures for memory systems in accordance with examples as disclosed herein.

FIG. 2 illustrates an example of a diagram 200 for a boot trace of a memory system that supports latency reduction of boot procedures for memory systems in accordance with examples as disclosed herein. Various devices that incorporate memory systems, such as the memory system 110, typically use a boot procedure to transition from an off-state or a low-power state to normal operations. The diagram 200 shows time of the boot procedure on the y-axis and shows a voltage drawn by the memory system during the procedure on the x-axis. The example of the boot procedure illustrated in FIG. 2 includes a plurality of different phases. In such examples, the boot trace may track the power consumed by the memory system during the boot procedure as time progresses. Each phase is characterized by a first duration with a lower power consumption and by a second duration that draws more power. At the end of each phase of the boot procedure, the memory system may reset one or more components. The resetting of the one or more components may reduce the power drawn by the memory system.

The memory system may reset one or more components during the boot procedure. The number of resets performed during the boot procedure may vary depending on the specific platform and/or system associated with the host system. Each reset may be associated with a different phase of the boot procedure. For example, the memory system may reset the one or more components at the beginning or end of each phase. After each reset, the memory system may proceed through an initialization process and subsequently communicate pages or blocks of information (e.g., parameters and descriptors) to the host system. The information may describe various characteristics of the memory system. Depending on the system, a period of 150 ms or more may elapse between resetting the one or more components and the memory system processes commands (e.g., read, write, etc.) received from the host system for that particular phase (e.g., duration 212 illustrated in FIG. 2). In some applications (e.g., automotive), the amount of time used to complete the boot procedure may affect consumer experience as well as functionality of interrelated systems. As described herein, the disclosed examples provide an ability to reduce the time used to complete the boot procedure.

At time t0, a first phase (Phase 1) of the boot procedure begins. After the boot procedure begins one or more components of the memory system may initialize during a first duration 202 of the first phase from t0 to t1 (e.g., as part of an initialization procedure). According to various examples, the first phase (or Phase 1) of the boot procedure can correspond to a partial initialization of the host system. In some examples, the first phase of the boot procedure can be initiated by the firmware of the host system. The first phase may correspond to a primary bootloader (PBL) portion of the boot procedure. During a second duration 204 of the first phase from t1 to t2, the host system can send commands to access the logical unit number (LUN) of the memory system associated with the boot device during the first phase of the boot procedure. The memory system may then access information and send it to the host system, which may cause the increase in power consumption seen in the second duration 204.

At 210 (and at t2), the first phase of the boot procedure is concluded in response one or more components of the memory system are reset (e.g., a host system may send an indication to reset the components). For example, the host system may set a flag associated with the memory system at 210, which may correspond to an initialization flag (e.g., fDeviceinit flag) whose value can be changed by the memory system as well as other systems that may be directly or indirectly connected to the memory system (e.g., the host system). At 210 (e.g., t2), the host system may adjust a value of the flag to indicate to the memory system to reset one or more components based on the operation of the boot procedure. The initialization flag may have a first value that indicates that the memory system is ready to perform commands (e.g., the initialization process is completed) and a second value that indicates that the initialization process is currently active or progressing. At time t2, the host system may change the value of the flag to be the first value. In response to the flag being the first value, the memory system begins a second phase (e.g., Phase 2) of the boot procedure by resetting one or more components of the memory system. In one example, the second phase may correspond to an eXtensible BootLoader (XBL) phase.

After the phase 2 of the boot procedure begins one or more components of the memory system may initialize during a third duration 212 of the second phase from t2 to t3 (e.g., as part of an initialization procedure). During a fourth duration 218 of the second phase from t3 to t4, the host system can send commands to access one or more locations in the memory system associated with the boot procedure. The memory system may then access information and send it to the host system, which may cause the increase in power consumption seen in the second duration 218. For example, at time t2, the memory system may receive a first command to perform a first reset of one or more components, thus ending the first phase and beginning the second phase. In one example, the first command can be received from the host system after completion of the first phase. In some examples, the command may be communicated by the host system changing the value of the flag at t2. The memory system may poll the flag at regular intervals to determine the current status. In response to the value of the flag changing, the memory system may initiate the first command to perform a first reset of the one or more components.

At 214 (e.g., t3), the memory system m may change the status of the flag to indicate that the initialization process associated with phase 2 of the boot procedure has been completed. Changing the value of the flag may indicate to the host system that the memory system is ready to perform other operations associated with phase 2 of the boot procedure. For example, the memory system may change the value of the flag from the second value to the first value (e.g., signaling the memory system is ready to perform commands). The host system may poll the flag at intervals to determine the current status during the third duration 212. In response to changing the value of the flag at 214 (e.g., t3), the host system may begin transmitting commands to access portions of the memory system as part of phase 2. The memory system may then access information and send it to the host system, which may cause the increase in power consumption seen in the second duration 218. In some examples, one or more of the second commands received during the duration 218 may be a request to communicate parameters corresponding to characteristics of the memory system. The characteristics of the memory system can be communicated, for example, to the host system. Receiving the command to communicate parameters may increase the power usage of the memory system, as shown by the voltage going to V4 at 216.

In one or more examples, the parameters communicated during the duration 218 may correspond to one or more descriptor types stored in the memory system. Depending on the specific system and/or platform, the different descriptor types may include: device, configuration, unit, interconnect, string, geometry, power, device health, etc. In some examples, the device descriptor may specify the device class and the protocol (command set) to use for accessing the memory system. The device descriptor may also specify the quantity of logical units contained within the memory system (e.g., a maximum quantity). The configuration descriptor may be modified to configure characteristics of the boot procedure depending on the specific platform being used. The unit descriptor may provide details regarding characteristics and capabilities of different logical units such as device geometry, addressable items, etc.

The one or more second commands may be received after the flag has been set from the second value to the first value. At 216 (e.g., between 3 and t4), the memory system may communicate the requested parameters to the host system. According to the illustrated examples, communicating the parameters can increase the power consumption of the memory system and cause components to operate at a higher voltage level (i.e., V4) than the partial initialization process of phase 1 or phase 2 (i.e., V2). The voltage levels can correspond, for example, to voltages used by a communication link between the memory system and the host system and more correspond to a relative speed at which information is being communicated between the memory system and the host system.

In the techniques described herein, the memory system may perform a configuration operation of L2P mapping of the memory system during the fourth duration 218 of the second phase. The configuration operation occurs over a duration that overlaps (at least in part) with the fourth duration 218 during which the parameters corresponding to the characteristics of the memory system are being communicated to the host system. In one example, the configuration operation can proceed as a background operation that may not interfere with communication of the memory system parameters to the host system. In other examples, the configuration operation may proceed undetected by the host system or some components of the memory system. The configuration operation may be triggered based on receiving the first command to perform the reset operation, initializing the reset operation for the one or more components, resetting the one or more components, adjusting the value of the flag, receiving the command to communicate the parameters, or a different time.

Such techniques may be in contrast to other configurations of the memory system. For example, a memory system may be configured to perform the configuration operation during the third duration 212, which may make such a duration longer. In such memory systems, the memory system may refrain from setting the flag to the first value until the configuration operation is complete. Such techniques may increase the duration of the boot procedure. In the techniques described herein, the configuration operation occurs during the duration 218 concurrently with transmitting parameters to the host system. By transmitting information to the host system and performing the configuration at the same time, the duration of the boot procedure. According to the disclosed examples, the amount of time used to perform the second phase of the boot procedure may be reduced as a result of the configuration operation being performed concurrently with communicating the requested parameters.

According to some examples, the configuration operation may involve various procedures by the memory system to build (e.g., generate) a L2P mapping for translating between logical addresses and physical addresses. The L2P mapping can subsequently be used to facilitate access to the memory system by the host system.

At 220 (e.g., t4), the host system may send a reset command (e.g., by changing the value of the flag from the first value to the second value), thus ending phase 2 of the boot procedure. The memory system may receive a command to perform an additional reset of one or more components at 220 (e.g., t4). In response to the flag being the first value, the memory system reset one or more components of the memory system. Depending on the specific hardware platform being utilized, the memory system may move to a third phase of the boot procedure or it may move to normal operations after resetting the one or more components during a fifth duration 236. For example, if the memory system moves to a third phase, it may reset its components during the fifth duration 236-a between t4 and t5. In another example, if the memory system moves to normal operations, it may reset its components during the fifth duration 236-b between t6 and t7 (and thus skipping what shown between t4 and t6). In one example, the third phase may correspond to Unified Extensible Firmware Interface (UEFI) phase of the boot procedure.

If the memory system has a third phase, at 220, the memory system may detect the status of the flag and begin its initialization process. At 224, the memory system may complete its initialization process, change the status of the flag, and/or receive one or more commands to access portions of the memory system associated with an operating system for use by the host system.

According to the examples disclosed herein, if a third phase is used, the memory system may perform an additional configuration operation (similar to one performed during the fourth duration 218) in order to prepare the L2P mapping for the memory system. Similar to the configuration operation performed during phase 2, the configuration operation of phase 3 may be performed concurrently or in the background while communicating with the host system during the sixth duration 222. According to one or more examples, the operating system information communicated during the sixth duration 222 can be in the form of kernel systems, android images, etc. According to the illustrated example, the third phase of the boot procedure may be completed at 228 (e.g., t6). In some cases, the host system may change the value of the flag, thereby causing the memory system to reset one or more components and thus end the third phase.

At t6, the boot procedure of the host system is complete, and the memory system may begin preparation to communicate information under normal operations. For example, the information may be communicated in response to read, write, erase, move, etc. commands received by the memory system. In an example, the commands may transmitted from the host system as part of the functionality of its operating system (e.g., android, Linux, Windows, etc.). During the duration 236-b, various initialization procedures may be performed by the memory system in preparation for normal access operations. At 232 (e.g., 7), the memory system may receive one or more commands to access information or store information. Such commands can be received at various times during the operations of the host system until a reset or reboot occurs. For example, the memory system may receive commands from the host system to retrieve or store data. Such data or information may be communicated with the host system during the duration 234. According to one or more examples, the information may be communicated with the host system at different voltage levels which may be indicative of the transfer speed at which the information is being exchanged. As illustrated in FIG. 2, the memory system may use power or may be powered at voltage levels V2, V3, or V4 (e.g., to communicate information).

Figure 3:
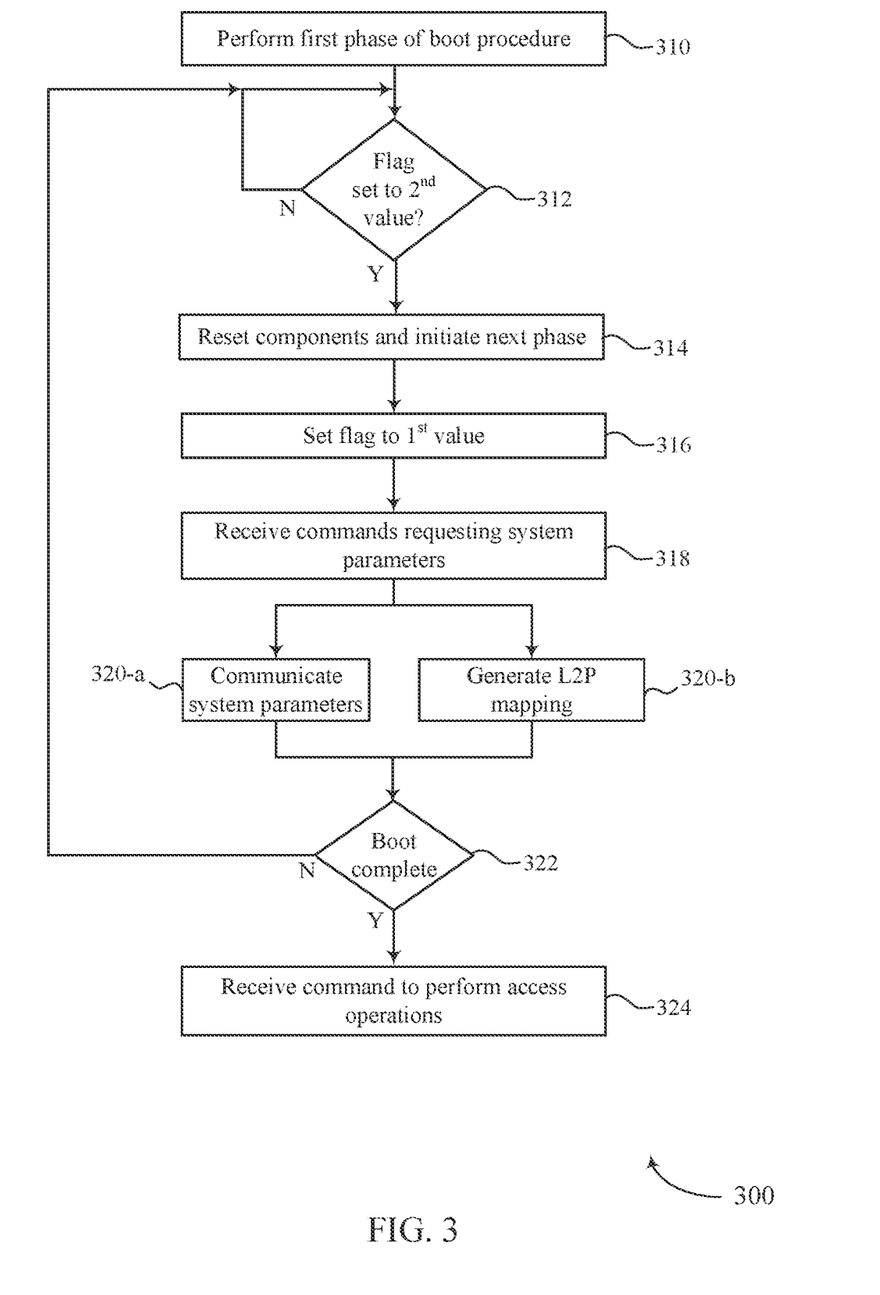
FIG. 3 shows a flowchart illustrating a method or methods that support latency reduction of boot procedures for memory systems in accordance with examples as disclosed herein.

FIG. 3 shows a flowchart illustrating a method 300 that support latency reduction of boot procedures for memory systems in accordance with examples as disclosed herein. Aspects of the method 300 may be implemented by a controller, among other components. Additionally or alternatively, aspects of the method 300 may be implemented as instructions stored in memory (e.g., firmware stored in a memory coupled with [application-specific device]). For example, the instructions, when executed by a controller (e.g., the application-specific controller), may cause the controller to perform the operations of the method 300.

At 310, a first phase a boot procedure may be performed. The memory system may receive a first command from the host system. The memory system may begin the boot procedure by initializing one or more components of the memory system and then communicating information with the host system. To end the first phase, the host system may change a value of a flag from a first value that indicates that the memory system is ready to perform commands (e.g., the initialization process is completed) to a second value that indicates that the initialization process is currently active or progressing.

At 312, it is determined whether a flag associated with the memory system has been set to the second value (e.g., by the memory system). In some examples, the memory system may poll contents of the register associated with the flag in order to monitor changes in value of its contents. The flag may correspond to an initialization flag (e.g., fDeviceinit flag) that may be accessed by the memory system or components and systems in direct or indirect communication with the memory system (e.g., a host system). If the flag has not been set to the second value, then the test (or polling) continues until a change is detected. If the flag has been set to the second value, then a second phase of the boot procedure is initiated. In an example, an initialization process may also be initiated by the memory system.

At 314, a first reset of one or more components of the memory system may be performed in response to the flag change to the second value. In one example, the first reset may be performed as part of a boot procedure for the host system. The resetting of the components may initiate the next phase of the boot procedure.

At 316, the flag may be set to the first value by the memory system. According to at least one example, this may indicate that the initialization process is complete and the memory system is ready to respond to commands from the host system in the current phase of the boot procedure. The host system may monitor the value of the flag by polling the contents of the associated register at intervals.

At 318, a request for communicating system parameters associated with the current phase of the boot procedure may be received (e.g., the memory system). According to some examples, the request may be in the form of one or more second commands received from the host system.

At 320-*a*, the system parameters (and/or other information) is communicated to the host system in response to receiving the second commands. At 320-*b*, a configuration operation for generating the L2P mapping may be performed. In some cases, the configuration operation may be performed concurrently with communicating the information with the host system at 320-*a*. For example, the configuration operation can be performed as a background task, silent task, etc. Accordingly, the host system may or may not be aware of the configuration operation being performed by the memory system. By performing the configuration operation in a concurrent manner, the latency associated with performing the boot procedure may be reduced. As part of receiving the commands at 318 and communicating system parameters at 320-*a*, the memory system may receive a third command to access an operating system image associated with the host system and communicate that information to the host system.

At 322, it is determined whether the boot procedure for the host system is complete. If the boot procedure includes more phases, the method may return 312 and perform the steps associated with a phase of the boot procedure, including generating the L2P mapping concurrently with communicating information. Said another way, if the boot procedure is not complete, then the steps for performing the next phase repeats itself to allow the host system to complete operations associated with the boot procedure. If the boot procedure is determined to be complete, then at 324, the memory system may receive one or more commands to perform access operations as part of normal operation. In one example, the access operations may include reading, writing, deleting, moving, etc. of information in the memory system. According to the disclosed examples, such fourth commands may be successively received by the memory system until the host system is reset or shut down.

Figure 4:
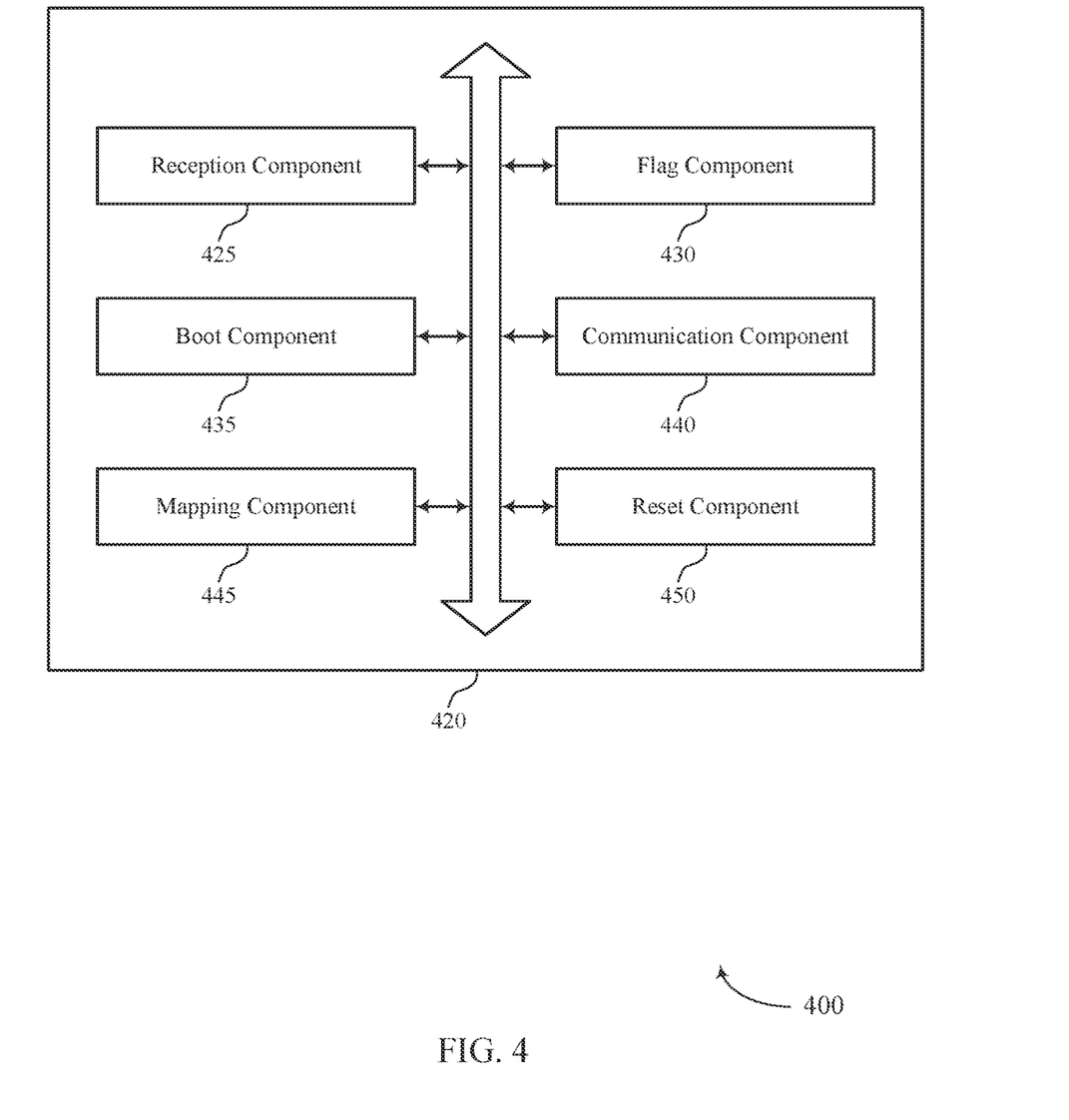
FIG. 4 shows a block diagram of a memory system that supports latency reduction of boot procedures for memory systems in accordance with examples as disclosed herein.

FIG. 4 shows a block diagram 400 of a memory system 420 that supports latency reduction of boot procedures for memory systems in accordance with examples as disclosed herein. The memory system 420 may be an example of aspects of a memory system as described with reference to FIGS. 1 through 3. The memory system 420, or various components thereof, may be an example of means for performing various aspects of latency reduction of boot procedures for memory systems as described herein. For example, the memory system 420 may include a reception component 425, a flag component 430, a boot component 435, a communication component 440, a mapping component 445, a reset component 450, or any combination thereof. Each of these components may communicate, directly or indirectly, with one another (e.g., via one or more buses).

The reception component 425 may be configured as or otherwise support a means for receiving a first command to perform a first reset of one or more components of a memory system as part of a first phase of a boot procedure of a host system. The flag component 430 may be configured as or otherwise support a means for determining whether a flag associated with the memory system is set from a first value to a second value based at least in part on receiving the first command. The boot component 435 may be configured as or otherwise support a means for initiating, by the memory system, an initialization process of a second phase of the boot procedure based at least in part on determining whether the flag is set. In some examples, the flag component 430 may be configured as or otherwise support a means for setting the flag from the second value to the first value based at least in part on completing the initialization process of the second phase. In some examples, the reception component 425 may be configured as or otherwise support a means for receiving a second command to communicate parameters corresponding to characteristics of the memory system with the host system based at least in part on setting the flag from the second value to the first value. The communication component 440 may be configured as or otherwise support a means for communicating the parameters corresponding to the characteristics of the memory system with the host system based at least in part on receiving the second command. The mapping component 445 may be configured as or otherwise support a means for performing a configuration operation of a logical-to-physical mapping of the memory system concurrently with communicating the parameters with the host system and after setting the flag from the second value to the first value.

In some examples, the reception component 425 may be configured as or otherwise support a means for receiving a third command to access an operating system stored within the memory system as part of the second phase of the boot procedure and based at least in part on performing the configuration operation.

In some examples, the reception component 425 may be configured as or otherwise support a means for receiving a fourth command to access information stored in the memory system based at least in part on performing the configuration operation and after the boot procedure is complete.

In some examples, the reception component 425 may be configured as or otherwise support a means for receiving a fifth command to access firmware code stored in the memory system for loading into a ROM of the host system based at least in part on performing the configuration operation.

In some examples, to support performing the configuration operation, the mapping component 445 may be configured as or otherwise support a means for building the logical-to-physical mapping for translating between logical addresses and physical address to provide access to the memory system.

In some examples, the reset component 450 may be configured as or otherwise support a means for resetting the one or more components of the memory system as part of the first phase of the boot procedure based at least in part on receiving the first command.

In some examples, the reception component 425 may be configured as or otherwise support a means for receiving, by the memory system, a sixth command to perform a second reset of the one or more components of the memory system as part of the second phase of the boot procedure and based at least in part on performing the configuration operation.

In some examples, the reception component 425 may be configured as or otherwise support a means for receiving, by the memory system, a seventh command to access an operating system stored within the memory system based at least in part on receiving the sixth command.

In some examples, the first value indicates the initialization process has not started or has not been completed. In some examples, the second value indicates the initialization process is progressing.

In some examples, concurrently performing the configuration operation reduces latency associated with receiving additional commands by the memory system.

Figure 5:
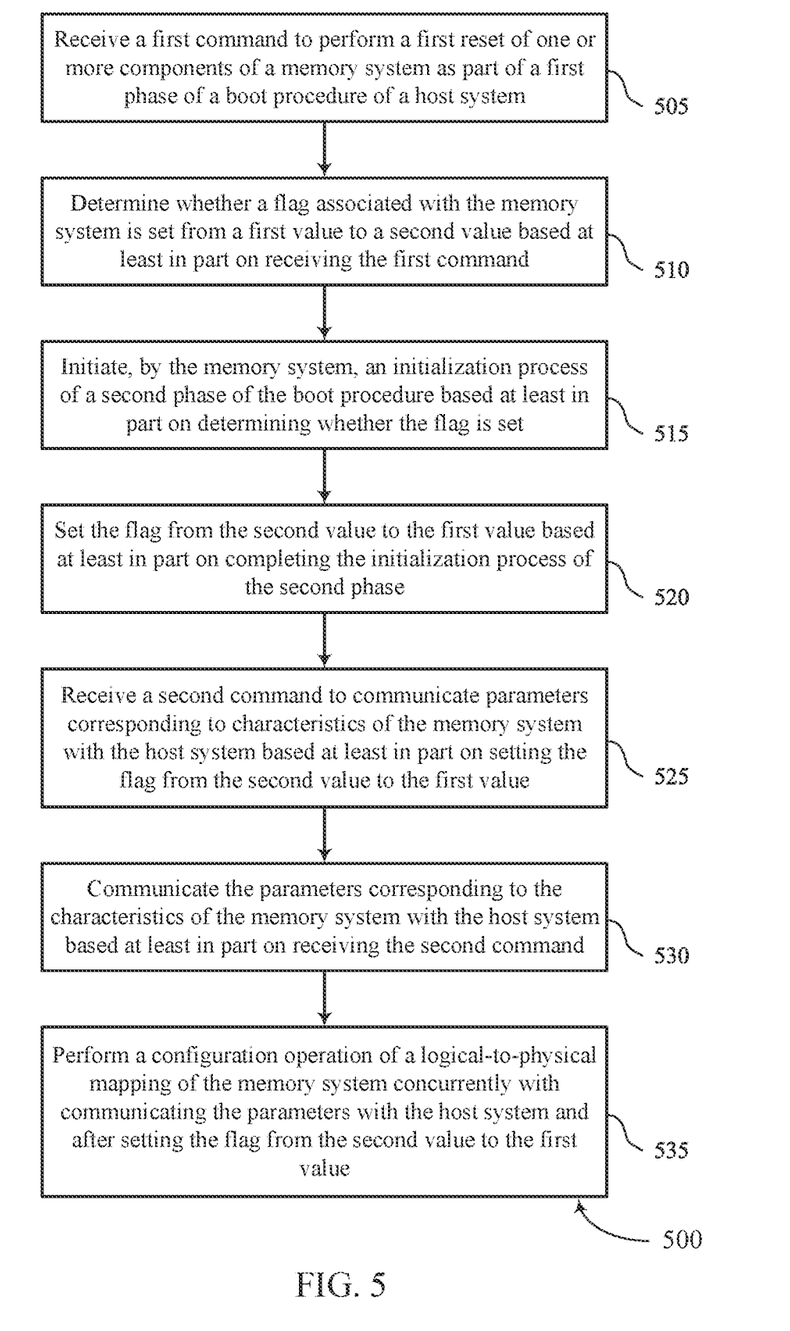
FIG. 5 shows a flowchart illustrating a method or methods that support latency reduction of boot procedures for memory systems in accordance with examples as disclosed herein.

FIG. 5 shows a flowchart illustrating a method 500 that supports latency reduction of boot procedures for memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a first command to perform a first reset of one or more components of a memory system as part of a first phase of a boot procedure of a host system. The operations of 505 may be performed in accordance with examples as disclosed herein. In some examples, aspects of the operations of 505 may be performed by a reception component 425 as described with reference to FIG. 4.

At 510, the method may include determining whether a flag associated with the memory system is set from a first value to a second value based at least in part on receiving the first command. The operations of 510 may be performed in accordance with examples as disclosed herein. In some examples, aspects of the operations of 510 may be performed by a flag component 430 as described with reference to FIG. 4.

At 515, the method may include initiating, by the memory system, an initialization process of a second phase of the boot procedure based at least in part on determining whether the flag is set. The operations of 515 may be performed in accordance with examples as disclosed herein. In some examples, aspects of the operations of 515 may be performed by a boot component 435 as described with reference to FIG. 4.

At 520, the method may include setting the flag from the second value to the first value based at least in part on completing the initialization process of the second phase. The operations of 520 may be performed in accordance with examples as disclosed herein. In some examples, aspects of the operations of 520 may be performed by a flag component 430 as described with reference to FIG. 4.

At 525, the method may include receiving a second command to communicate parameters corresponding to characteristics of the memory system with the host system based at least in part on setting the flag from the second value to the first value. The operations of 525 may be performed in accordance with examples as disclosed herein. In some examples, aspects of the operations of 525 may be performed by a reception component 425 as described with reference to FIG. 4.

At 530, the method may include communicating the parameters corresponding to the characteristics of the memory system with the host system based at least in part on receiving the second command. The operations of 530 may be performed in accordance with examples as disclosed herein. In some examples, aspects of the operations of 530 may be performed by a communication component 440 as described with reference to FIG. 4.

At 535, the method may include performing a configuration operation of a logical-to-physical mapping of the memory system concurrently with communicating the parameters with the host system and after setting the flag from the second value to the first value. The operations of 535 may be performed in accordance with examples as disclosed herein. In some examples, aspects of the operations of 535 may be performed by a mapping component 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command to perform a first reset of one or more components of a memory system as part of a first phase of a boot procedure of a host system; determining whether a flag associated with the memory system is set from a first value to a second value based at least in part on receiving the first command; initiating, by the memory system, an initialization process of a second phase of the boot procedure based at least in part on determining whether the flag is set; setting the flag from the second value to the first value based at least in part on completing the initialization process of the second phase; receiving a second command to communicate parameters corresponding to characteristics of the memory system with the host system based at least in part on setting the flag from the second value to the first value; communicating the parameters corresponding to the characteristics of the memory system with the host system based at least in part on receiving the second command; and performing a configuration operation of a logical-to-physical mapping of the memory system concurrently with communicating the parameters with the host system and after setting the flag from the second value to the first value.

Aspect 2: The method, apparatus, or non-transitory computer-readable medium of aspect 1, further including operations, features, circuitry, logic, means, or instructions, or any combination thereof for receiving a third command to access an operating system stored with within the memory system as part of the second phase of the boot procedure and based at least in part on performing the configuration operation.

Aspect 3: The method, apparatus, or non-transitory computer-readable medium of any of aspects 1 through 2, further including operations, features, circuitry, logic, means, or instructions, or any combination thereof for receiving a fourth command to access information stored in the memory system based at least in part on performing the configuration operation and after the boot procedure is complete.

Aspect 4: The method, apparatus, or non-transitory computer-readable medium of any of aspects 1 through 3, further including operations, features, circuitry, logic, means, or instructions, or any combination thereof for receiving a fifth command to access firmware code stored in the memory system for loading into a ROM of the host system based at least in part on performing the configuration operation.

Aspect 5: The method, apparatus, or non-transitory computer-readable medium of any of aspects 1 through 4, where performing the configuration operation further includes operations, features, circuitry, logic, means, or instructions, or any combination thereof for building the logical-to-physical mapping for translating between logical addresses and physical address to provide access to the memory system.

Aspect 6: The method, apparatus, or non-transitory computer-readable medium of any of aspects 1 through 5, further including operations, features, circuitry, logic, means, or instructions, or any combination thereof for resetting the one or more components of the memory system as part of the first phase of the boot procedure based at least in part on receiving the first command.

Aspect 7: The method, apparatus, or non-transitory computer-readable medium of any of aspects 1 through 6, further including operations, features, circuitry, logic, means, or instructions, or any combination thereof for receiving, by the memory system, a sixth command to perform a second reset of the one or more components of the memory system as part of the second phase of the boot procedure and based at least in part on performing the configuration operation.

Aspect 8: The method, apparatus, or non-transitory computer-readable medium of aspect 7, further including operations, features, circuitry, logic, means, or instructions, or any combination thereof for receiving, by the memory system, a seventh command to access an operating system stored within the memory system based at least in part on receiving the sixth command.

Aspect 9: The method, apparatus, or non-transitory computer-readable medium of any of aspects 1 through 8, where the first value indicates the initialization process has not started or has not been completed and the second value indicates the initialization process is progressing.

Aspect 10: The method, apparatus, or non-transitory computer-readable medium of any of aspects 1 through 9, where concurrently performing the configuration operation reduces latency associated with receiving additional commands by the memory system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller associated with a memory device, wherein the controller is configured to cause the apparatus to:
receive a first command to perform a first reset of one or more components of a memory system as part of a first phase of a boot procedure of a host system;
determine whether a flag associated with the memory system is set from a first value to a second value based at least in part on receiving the first command;
initiate, by the memory system, an initialization process of a second phase of the boot procedure based at least in part on determining whether the flag is set;
set the flag from the second value to the first value based at least in part on completing the initialization process of the second phase;
receive a second command to communicate parameters corresponding to characteristics of the memory system with the host system based at least in part on setting the flag from the second value to the first value;
communicate the parameters corresponding to the characteristics of the memory system with the host system based at least in part on receiving the second command; and
perform a configuration operation of a logical-to-physical mapping of the memory system concurrently with communicating the parameters with the host system and after setting the flag from the second value to the first value.

2. The apparatus of claim 1, wherein the controller is further configured to cause the apparatus to:
receive a third command to access an operating system stored with within the memory system as part of the second phase of the boot procedure and based at least in part on performing the configuration operation.

3. The apparatus of claim 1, wherein the controller is further configured to cause the apparatus to:
receive a fourth command to access information stored in the memory system based at least in part on performing the configuration operation and after the boot procedure is complete.

4. The apparatus of claim 1, wherein the controller is further configured to cause the apparatus to:
receive a fifth command to access firmware code stored in the memory system for loading into a read-only memory (ROM) of the host system based at least in part on performing the configuration operation.

5. The apparatus of claim 1, wherein performing the configuration operation is further configured to cause the apparatus to:
build the logical-to-physical mapping for translating between logical addresses and physical address to provide access to the memory system.

6. The apparatus of claim 1, wherein the controller is further configured to cause the apparatus to:
reset the one or more components of the memory system as part of the first phase of the boot procedure based at least in part on receiving the first command.

7. The apparatus of claim 1, wherein the controller is further configured to cause the apparatus to:
receive, by the memory system, a sixth command to perform a second reset of the one or more components of the memory system as part of the second phase of the boot procedure and based at least in part on performing the configuration operation.

8. The apparatus of claim 7, wherein the controller is further configured to cause the apparatus to:
receive, by the memory system, a seventh command to access an operating system stored within the memory system based at least in part on receiving the sixth command.

9. The apparatus of claim 1, wherein:
the first value indicates the initialization process has not started or has not been completed; and
the second value indicates the initialization process is progressing.

10. The apparatus of claim 1, wherein concurrently performing the configuration operation reduces latency associated with receiving additional commands by the memory system.

11. A non-transitory computer-readable medium storing code, the code comprising instructions executable by a processor to:
receive a first command to perform a first reset of one or more components of a memory system as part of a first phase of a boot procedure of a host system;
determine whether a flag associated with the memory system is set from a first value to a second value based at least in part on receiving the first command;
initiate, by the memory system, an initialization process of a second phase of the boot procedure based at least in part on determining whether the flag is set;
set the flag from the second value to the first value based at least in part on completing the initialization process of the second phase;
receive a second command to communicate parameters corresponding to characteristics of the memory system with the host system based at least in part on setting the flag from the second value to the first value;
communicate the parameters corresponding to the characteristics of the memory system with the host system based at least in part on receiving the second command; and
perform a configuration operation of a logical-to-physical mapping of the memory system concurrently with communicating the parameters with the host system and after setting the flag from the second value to the first value.

12. The non-transitory computer-readable medium of claim 11, wherein the instructions are further executable by the processor to: receive a third command to access an operating system stored with within the memory system as part of the second phase of the boot procedure and based at least in part on performing the configuration operation.

13. The non-transitory computer-readable medium of claim 11, wherein the instructions are further executable by the processor to: receive a fourth command to access information stored in the memory system based at least in part on performing the configuration operation and after the boot procedure is complete.

14. The non-transitory computer-readable medium of claim 11, wherein the instructions are further executable by the processor to: receive a fifth command to access firmware code stored in the memory system for loading into a read-only memory (ROM) of the host system based at least in part on performing the configuration operation.

15. The non-transitory computer-readable medium of claim 11, wherein the instructions to perform the configuration operation are further executable by the processor to: build the logical-to-physical mapping for translating between logical addresses and physical address to provide access to the memory system.

16. A method, comprising:
receiving a first command to perform a first reset of one or more components of a memory system as part of a first phase of a boot procedure of a host system;
determining whether a flag associated with the memory system is set from a first value to a second value based at least in part on receiving the first command;
initiating, by the memory system, an initialization process of a second phase of the boot procedure based at least in part on determining whether the flag is set;
setting the flag from the second value to the first value based at least in part on completing the initialization process of the second phase;
receiving a second command to communicate parameters corresponding to characteristics of the memory system with the host system based at least in part on setting the flag from the second value to the first value;
communicating the parameters corresponding to the characteristics of the memory system with the host system based at least in part on receiving the second command; and
performing a configuration operation of a logical-to-physical mapping of the memory system concurrently with communicating the parameters with the host system and after setting the flag from the second value to the first value.

17. The method of claim 16, further comprising:
receiving a third command to access an operating system stored with within the memory system as part of the second phase of the boot procedure and based at least in part on performing the configuration operation.

18. The method of claim 16, further comprising:
receiving a fourth command to access information stored in the memory system based at least in part on performing the configuration operation and after the boot procedure is complete.

19. The method of claim 16, further comprising:
receiving a fifth command to access firmware code stored in the memory system for loading into a read-only memory (ROM) of the host system based at least in part on performing the configuration operation.

20. The method of claim 16, wherein performing the configuration operation further comprises:
building the logical-to-physical mapping for translating between logical addresses and physical address to provide access to the memory system.

\* \* \* \* \*